Patented Mar. 30, 1943

2,315,046

UNITED STATES PATENT OFFICE 2,315,046

PRODUCTION OF KETONES

Alva C. Byrns, Palos Verdes Estates, Calif., assignor to Union Oil Company of California, Los Angeles, Calif., a corporation of California No Drawing. Application March 5, 1940, Serial No. 322,341

7 Claims. (Cl. 260—593)

This invention relates to processes for producing ketones and related compounds. The invention further resides in the production of new and novel ketones of distinctive odor useful as solvents, chemical intermediates and as ingredients in perfumes.

In a more specific sense, the invention is concerned with processes for selectively reacting organic acid anhydrides with olefins, preferably in the presence of a mild catalytic agent such as, for example, anhydrous zinc chloride, to produce compounds of ketonic character which are readily recoverable in high yields from the reaction mass.

Heretofore, it has been recognized that olefins would react with organic acid chlorides in the presence of anhydrous aluminum chloride to produce chloroketones. Nenitzescu and Gavat (Annalen, vol. 519, page 260, 1935) observed that propylene would react with acetyl chloride in the presence of a large excess of anhydrous aluminum chloride to produce a chloroketone which could be subsequently condensed with benzene to form a phenyl pentanone as shown by the following equation:

$$CH_3-CH=CH_2+CH_3-CO-Cl \xrightarrow{(AlCl_3)}$$

$$\begin{array}{c} CH_3 \\ \diagdown \\ CH-CH_2-CO-CH_3 \\ \diagup \\ Cl \end{array} \xrightarrow{(C_6H_6)}$$

$$\begin{array}{c} CH_3 \\ \diagdown \\ CH-CH_2-CO-CH \\ \diagup \\ C_6H_5 \end{array}$$

Likewise, it has been shown by Adams and Noller ("Organic Synthesis," collective vol. I, page 105, John Wiley and Sons, 1932) that acetic anhydride will react with benzene in the presence of anhydrous aluminum chloride to form acetophenone, an aralkyl ketone. In order to obtain maximum yields of acetophenone it is necessary to use at least two mols of aluminum chloride for each mol of acetic anhydride. Groggins, Nagel and Stirton (Industrial and Engineering Chemistry, vol. 26, page 1317, 1934) have demonstrated that the reaction proceeds through the formation of acetyl chloride from the acetic anhydride and part of the aluminum chloride, and subsequent reaction of the acetyl chloride with the benzene in a manner typical of the well known Friedel and Crafts reaction. It is to be particularly noted in the last example that there is a copious evolution of hydrogen chloride as the reaction progresses. Furthermore, under relatively mild reaction conditions, mild catalysts, such as for example, anhydrous zinc chloride, will not cause the reaction to occur, possibly due to inability to form the acid chloride from the anhydride. In typical Friedel and Crafts reactions and variations thereof, such as the two above described examples, it is usually necessary to employ at least one, and ordinarily two or more, mols of catalyst per mol of reactant in order to realize a maximum yield of the desired product. The catalyst reacts chemically with the reactants and is ordinarily not readily recoverable.

It is an object of my invention to provide a process for selectively reacting an olefin with an organic acid anhydride to produce ketonic compounds. It is another object to produce ketonic compounds by selectively reacting an acid anhydride with an olefin in the presence of a mild catalyst. It is a further object to provide a process for producing ketonic compounds by the combination of an olefin with an organic acid anhydride in which a relatively small proportion of catalyst to reactants is required and in which at least a portion of the catalyst is recoverable either unchanged or in useful form.

I have now discovered that if an olefin is contacted with an organic acid anhydride under appropriate conditions, a chemical reaction occurs which may be represented by the following general equations:

(1)
$$\underset{\substack{\text{Aliphatic} \\ \text{olefin}}}{C_nH_{2n}} + \underset{\text{acid anhydride}}{R-CO-O-CO-R} \longrightarrow \underset{\text{ketone}}{C_nH_{2n-1}COR} + \underset{\substack{\text{carboxylic} \\ \text{acid}}}{RCOOH}$$

(2)
$$\underset{\substack{\text{Cyclo} \\ \text{olefin}}}{C_mH_{2m-2}} + \underset{\text{acid anhydride}}{R-CO-O-CO-R} \longrightarrow \underset{\text{ketone}}{C_mH_{2m-3}COR} + \underset{\substack{\text{carboxyl-} \\ \text{ic acid}}}{RCOOH}$$

In the foregoing equations, $n$ and $m$ represent integers, $n$ having a value of 3 or higher and $m$ having a value of 5 or higher. R represents a hydrocarbon radical. The hydrocarbon radicals present in the acid anhydride may be the same, as they are in acetic anhydride, $$CH_3-CO-O-CO-CH_3,$$

or they may be different as in a mixed acid anhydride, such as $CH_3-CO-O-CO-C_6H_5$ or they may be combined in one radical so as to give a cyclic structure, such as is present for example, in phthalic anhydride and succinic anhydride. In the case of acid anhydrides of the latter type, the reaction results in the formation of a keto acid as shown in the following exemplary equation:

(3)

$$\underset{\text{Phthalic anhydride}}{\begin{array}{c}\diagup CO \\ \diagdown CO\end{array}\!\!\!\!\!O} + \underset{\text{butylene}}{C_4H_8} \longrightarrow \underset{\text{keto acid}}{\begin{array}{c}-CO-C_4H_7 \\ -COOH\end{array}}$$

Equation 1 above, represents the combination of an olefin of the aliphatic or ethylene series of hydrocarbons with an organic acid anhydride to form a ketone and an organic acid. Although I have found that any olefin of the aliphatic series of hydrocarbons will react with an organic acid anhydride to produce a ketonic compound under sufficiently rigorous conditions, I have further discovered that olefins having branched carbon chains and especially those having the following configurations or structures which are converted into the following configurations under the conditions of the reaction, are particularly reactive and will combine with an organic acid anhydride under relatively mild reaction conditions.

(1)
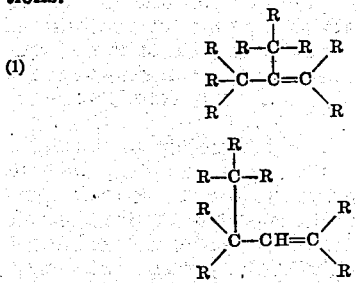

(2)

In the above structural formulas, R represents either a hydrogen atom or a hydrocarbon radical and the various R's may be the same or different. As typical examples of the compounds represented by the above general formulas, the following may be given:

*Group 1*

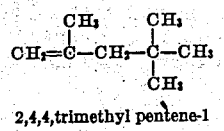

2,4,4,trimethyl pentene-1

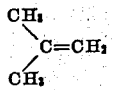

Isobutylene

*Group 2*

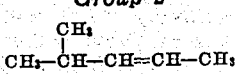

4 methyl pentene-2

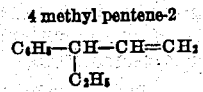

3 phenyl pentene-1

It is one of the objects of the present invention to provide a process for producing ketones under relatively mild reaction conditions by reacting organic acid anhydrides with olefins having the structural configurations

and $R_2C(CR_3)$—$CH=CR_2$ and preferably those having the structural configuration

where R represents either a hydrogen atom or a hydrocarbon radical and preferably either hydrogen or an alkyl hydrocarbon radical and the various R's may be the same or different.

Equation 2 above represents the combination of a cylclo-olefin with an acid anhydride to produce a ketonic compound. Cyclic olefins, such as for example, cyclohexene, cyclopentene and methyl cyclohexene, appear to condense with acid anhydrides to form ketones as readily as do the branched chain olefins of the aliphatic hydrocarbon series. Therefore, in general, the same reaction conditions and catalysts which cause formation of ketonic compounds from branched chain olefins of the aliphatic hydrocarbon series and acid anhydrides will likewise lead to the formation of ketones by the interaction of cyclo-olefins and organic acid anhydrides.

I have further discovered that the reaction is most readily carried out with those organic acid anhydrides which are fluid at ordinary atmospheric temperatures. These comprise the acid anhydrides of the lower molecular weight mono carboxylic acids of the aliphatic series, such as acetic anhydride, propionic anhydride, butyric anhydride, etc., and of the naphthenic acids. The structures of the latter compounds are not definitely known but they are believed to be mono-carboxylic acids containing one or more naphthenic hydrocarbon rings, the rings being either mono or hetero-cyclic. In many of the industrial applications of ketones, it appears that methyl ketones, that is, those possessing the $CH_3$—$CO$ group, are particularly valuable. Such ketones can be obtained by the processes of the present invention by employing acetic anhydride as the acid anhydride to be reacted with the olefin, and this anhydride is, therefore, to be particularly preferred. Where it is desired to react those acid anhydrides which are solid at the usual atmospheric temperatures it is ordinarily necessary to employ an inert solvent as the reaction medium or conduct the reaction at a sufficiently elevated temperature to melt the acid anhydride.

In addition to the foregoing, I have observed that if an olefin, particularly a branched chain olefin of the types described hereinabove, such as, for example, diisobutylene, is mixed at atmospheric temperature with an organic acid anhydride, there is little or no evidence that any reaction occurs and in fact it is possible to separate the olefin from the anhydride substantially unchanged. However, if a quantity of a mild catalyst, such as, for example, anhydrous zinc chloride, is added to the mixture of olefin and acid anhydride at room temperature, it is immediately apparent that a reaction is occurring as is evidenced by the evolution of considerable heat and a marked change in the odor of the material. Closer examination of the mass reveals that a ketone has been formed. Another catalyst which appears to induce a similar type of reaction is concentrated sulfuric acid.

If anhydrous aluminum chloride is added to a mixture of olefin and acid anhydride at room temperature a reaction occurs accompanied with evolution of hydrogen chloride, but the resultant product appears to be a mixture of many different compounds boiling over a wide range of temperatures with no particular compound being formed in relatively large amount. This is readily understandable in view of the known high activity of aluminum chloride and its ability to rupture as well as cause the formation of carbon to carbon bonds.

It is an additional object of the present invention to produce ketones by reacting an olefin, preferably a branched chain olefin having one of the configurations described hereinabove, with an organic acid anhydride, preferably derived from one of the lower molecular weight mono-carboxylic acids, said reaction being conducted in the presence of a mild catalytic agent such as anhydrous zinc chloride and at atmospheric or somewhat elevated temperatures.

Other features, advantages and objects of the present invention, will become apparent to those skilled in the art from the following specific examples:

EXAMPLE 1

Approximately 150 grams of anhydrous zinc chloride (technical, 94% pure, equivalent to 1 mol) was added to 120 milliliters of acetic anhydride (equivalent to 1.2 mols). Most of the zinc chloride dissolves in the anhydride to form a fluid mass, heat being evolved and a complex of the two compounds possibly being formed. The temperature of the mass is preferably maintained in the neighborhood of 100° F. throughout the experiment and in any event it is not to exceed 200° F. since at higher temperatures acetic anhydride appears to decompose to a tarry mass in the presence of zinc chloride. Reaction will occur at temperatures considerably below 100° F. but the formation of the ketone is slow and intimate contacting of the acetic anhydride-zinc chloride mixture with the olefin is more difficult to obtain because of the decreased fluidity of the reaction mass.

After most of the zinc chloride had dissolved in the acetic anhydride and the temperature had been adjusted to approximately 100° F., 150 milliliters of commercial diisobutylene (equivalent to 1 mol) was added over a period of two hours and intimately mixed with the acetic anhydride-zinc chloride complex. Considerable heat is evolved during the reaction and it was necessary to cool the reaction mixture in order to maintain the temperature in the neighborhood of 100° F.

Commercial diisobutylene is a mixture of two principal isomers: 2,4,4-trimethyl pentene-1 and 2,4,4-trimethyl pentene-2, comprising about 80% and 20% of the commercial product, respectively.

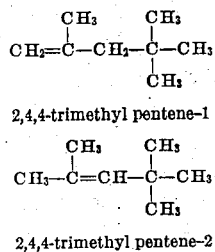

2,4,4-trimethyl pentene-1

2,4,4-trimethyl pentene-2

After all of the diisobutylene had been added, the mass was agitated for an additional two hours in order to allow time for the reaction to complete itself and 300-400 milliliters of water were then added into the reaction vessel. This caused a separation of the reaction mixture into two liquid phases; a lower aqueous phase containing zinc chloride and acetic acid and an upper brownish-colored phase constituting the crude ketone. In passing it should be particularly noted that at no stage in the process was there any evidence of the formation of hydrogen chloride, thus distinguishing this reaction from the usual Friedel-Crafts reactions.

The two phases were separated, and the upper washed twice with water and finally treated with dilute sodium carbonate solution to remove the last traces of acetic acid. The ketone formed is at most only very slightly soluble in water, and, if adequate settling is allowed very little of the material is lost in the aqueous zinc chloride phase or the water washings.

The washed crude ketone, amounting to 146 milliliters was finally fractionated under reduced pressure to produce a practically colorless mobile liquid of narrow boiling range and distinctive pleasant odor. The crude ketone can be fractionated at atmospheric pressure but the resultant material is yellowish in color, possibly due to the presence of small amounts of decomposition products. Steam distillation of the crude ketone can be resorted to if desired.

The pure ketone constituted approximately 85% of the recovered crude ketone phase, the remaining 15% being principally unreacted diisobutylene together with a small amount of high boiling material, possibly tetraisobutylene. The pure ketone exhibited the following physical properties:

| | |
|---|---|
| Specific gravity, 60/60° F | 0.848 |
| Refractive index | 1.452 |
| Boiling point, °F. (uncorr.) | 375 |
| Boiling point, °F. 18 mm. (uncorr.) | 173 |

Quantitative analysis of the pure ketone indicated that it had the following percentage composition; carbon 77.60%, hydrogen 11.92%, and oxygen 10.40%. These values are in good agreement with those of the expected empirical formula $C_{10}H_{18}O$ which has the following percentage composition; carbon 77.87%, hydrogen 11.76% and oxygen 10.37%. These results indicate that the reaction takes place in accordance with the following equation:

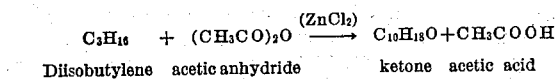

Diisobutylene   acetic anhydride        ketone   acetic acid

It is characteristic of ketones in general to react with semi-carbazide, $NH_2$—CO—NH—$NH_2$, to form semi-carbazones,

the latter in general being easily purified solids, the physical characteristics of which can be used to identify the ketone. The narrow boiling fraction obtained from the distillation of the crude ketone layer was added to an aqueous solution of semi-carbazide hydrochloride to which had been added an excess of sodium acetate. A solid precipitate separated indicating the formation of the semi-carbazone and demonstrating that the compound obtained is a ketone. The melting point of the separated and purified semi-carbazone is 334–336° F. (uncorr.).

Another reaction which is characteristic of the $CH_3CO$ group or groups which will ready yield this configuration under the conditions of the test is the "Haloform reaction," an improved modification of which is described by Fuson and Tullock, Journal of the American Chemical Society, vol. 56, page 1638 (1934). The test depends upon the reaction of sodium hypoiodite with compounds containing the $CH_3CO$ group to form iodoform. The narrow boiling fraction obtained from the distillation of the crude ketone was tested in accordance with the description of Fuson and Tullock, noted above, and iodoform positively identified in the reaction products. This evidence taken in conjunction with that for the formation of a semi-carbazone definitely indicates that the compound isolated contains a $CH_3CO$ group and therefore has the formula $CH_3$—CO—$C_8H_{15}$.

From a consideration of the reactivity of the ketone and the fact that it does not add bromine readily, it is believed that the ketone isolated from the crude reaction mixture has the structural formula

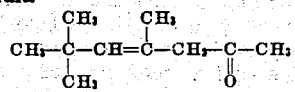

or possibly

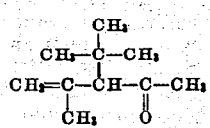

or possibly a mixture of these and other closely related structures.

The yield of the ketone $C_{10}H_{18}O$ obtained in the above experiment is approximately 65 mol percent and after making allowance for unreacted diisobutylene recovered, it is evident that there is an appreciable amount of diisobutylene unaccounted for. The aqueous phase separated from the crude ketone after hydrolysis of the reaction product was cooled to a temperature of approximately 35° F. A crystalline solid of slightly yellowish color precipitated and was separated from the supernatant liquid by filtration. Precipitation of the crystalline material can likewise be accomplished through concentration of the solution by partial evaporation. This crystalline product appears to be a complex comprising zinc chloride and a ketone having fourteen carbon atoms. This crystalline complex reacts with hydroxylamine to form a crystalline oxime with the liberation of zinc chloride and with dilute ammonia to form an imine boiling at 114.5° C. at a pressure of 25 mm. Of particular interest is the fact that an aqueous solution of the crystalline complex reacts readily with aniline at room temperature to form a Schiff's base type of compound.

EXAMPLE 2

The yields of ketones realizable from any given set of reactance is apparently markedly affected by the order in which the reactants are added into the reaction vessel. In an experiment comparable to Example 1, 4350 grams of anhydrous zinc chloride (technical, 94% pure) was mixed with 4600 milliliters of commercial diisobutylene and 3150 milliliters of acetic anhydride subsequently added slowly to the mixture. After allowing sufficient time for the reaction to complete itself, the mixture was hydrolyzed with water in the manner previously described in Example 1 above. Approximately 3870 milliliters of crude ketone was obtained and on fractionation of the material, it was found that there was no unreacted diisobutylene present, the product being comprised essentially of 50% of the desired ketone and 50% of a high boiling hydrocarbon, apparently tetraisobutylene. The molal yield of the desired ketone was only 26.5%.

Since mild catalysts such as zinc chloride will catalyze the polymerization of olefins, it appears that the most desirable process for obtaining maximum yield of ketones comprises admixture of the organic acid anhydride with the catalyst and subsequent slow addition of the olefin to the anhydride-catalyst mixture in order to avoid any large excess of unreacted olefin in contact with the catalyst.

EXAMPLE 3

Five grams of anhydrous zinc chloride (equivalent to 1/30 mol) was admixed with 35 milliliters of acetic anhydride (equivalent to 1/3 mol) and 50 milliliters of commercial diisobutylene (equivalent to 1/3 mol) subsequently added slowly. After allowing the reaction to complete itself, 5 grams of crystalline complex and 22 milliliters (equivalent to 0.12 mols) of ketone, $C_{10}H_{18}O$, were recovered. This indicates that each mol of zinc chloride is capable of causing the formation of at least four mols of ketone.

EXAMPLE 4

Three milliliters of 94% $H_2SO_4$ was mixed with 30 milliliters of acetic anhydride, the mixture cooled to room temperature and 30 milliliters of commercial diisobutylene added. After allowing one hour for the reaction to complete itself, the mixture was hydrolyzed with water and 28 milliliters of a separated ketone phase recovered, of which approximately 70% was estimated to be ketone $C_{10}H_{18}O$.

EXAMPLE 5

Twenty grams of anhydrous zinc chloride was added to 20 milliliters of acetic anhydride and 20 milliliters of cyclohexene (obtained from Eastman) subsequently added. After hydrolysis of the reaction mixture and fractionation of the ketone layer, 18 milliliters of an oil was obtained which had an odor similar to that of acetophenone. The oil was identified as a ketone.

EXAMPLE 6

A quantity of 2-ethylhexanol (obtained from Carbide and Carbon Chemicals Corporation) was dehydrated to give a mixture of octylenes. This mixture of octylenes was reacted with acetic anhydride in the presence of zinc chloride in the manner outlined in the previous examples. The hydrolyzate from the reaction mass was comprised principally of ketones.

The foregoing exemplary description of my invention is not to be considered as limiting since many variations may be made within the scope of the following claims by those skilled in the art without departing from the spirit thereof.

I claim:

1. A method for the production of ketones which comprises reacting an olefin with an organic acid anhydride in the presence of anhydrous zinc chloride.

2. A method for the production of ketones which comprises reacting acetic anhydride with di-isobutylenes in the presence of zinc chloride as a catalyst.

3. A method for producing ketones which comprises reacting acetic anhydride with di-isobutylene in the presence of zinc chloride as a catalyst, at a temperature of about 100° F. to about 150° F.

4. A ketone having the structural formula:

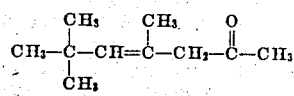

5. A ketone having the structural formula:

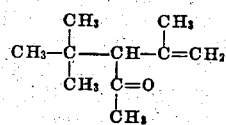

6. A method according to claim 1 in which the olefin employed is a cyclo-olefin.

7. A method according to claim 1 in which the olefin employed is a normally liquid olefin.

ALVA C. BYRNS.